(12) United States Patent
Manzi et al.

(10) Patent No.: US 6,298,333 B1
(45) Date of Patent: Oct. 2, 2001

(54) USE TAX OPTIMIZATION PROCESS AND SYSTEM

(75) Inventors: Sharon Ann Manzi, West Norriton; Raju S. Kakarlapudi, Devon, both of PA (US)

(73) Assignee: Transport International Pool, Inc.

( * ) Notice: Subject to any disclaimer, the term of this patent is extended or adjusted under 35 U.S.C. 154(b) by 0 days.

(21) Appl. No.: 09/499,789

(22) Filed: Feb. 8, 2000

(51) Int. Cl.$^7$ ....................................................... G06F 17/60
(52) U.S. Cl. .................................. 705/31; 705/19
(58) Field of Search ................... 705/19, 22, 28, 705/30, 31

(56) References Cited

U.S. PATENT DOCUMENTS

| | | | | |
|---|---|---|---|---|
| 1,830 | * | 1/1840 | Petrimoulx et al. .................... | 705/31 |
| 5,335,169 | * | 8/1994 | Chong ..................................... | 705/31 |
| 5,943,657 | * | 8/1999 | Freestone et al. ........................ | 705/1 |
| 6,148,291 | * | 11/2000 | Radican .................................. | 705/28 |

FOREIGN PATENT DOCUMENTS 4-98494-A * 3/1992 (JP) .

OTHER PUBLICATIONS

Dun's Business Month "Trucks, taxes, and tribulation (taxation of truck fleets)", article (v123, p124), dated Oct. 1983.*

* cited by examiner

Primary Examiner—Dean J. Kramer
(74) Attorney, Agent, or Firm—Evelyn H. McConathy; Dilworth Paxson LLP

(57) ABSTRACT

A computer system and method for a lessor to determine correct use tax on moveable equipment which may be subject to tax by more than one tax authority comprising inventory records for each individual item of equipment comprising an equipment identifier, equipment category, acquisition cost, depreciation, net book value, and branch; updating the inventory records to reflect each modification, improvement, disposition, and change in equipment category, and use tax paid; activity records comprising each lease event pertaining to each item of equipment; and a set of tax rules, which are periodically updated, for each taxing authority where any of the items of equipment may be leased or used, comprising sets of formulas reflecting relationships between tax due and acquisition of equipment, first leasing of equipment, subsequent leasing of equipment, length of lease term, age of equipment, and/or equipment categories. Upon selection of a tax authority and a date range, the amount of tax which is due to the selected tax authority for each item of equipment is automatically determined and, upon verification that tax will be paid, the inventory records are updated to reflect tax paid. Upon querying the system to determine availability of equipment of a selected class, delivery branch, and date range, the system preferably ranks available equipment according to the amount of use tax which will be due upon leasing.

11 Claims, 2 Drawing Sheets

USE TAX OPTIMIZATION PROCESS AND SYSTEM

BACKGROUND OF THE INVENTION

This invention relates to methods and systems for leasing equipment, and particularly to sales and use tax optimization.

Each taxing authority has different laws and rules for sales and use tax on leased equipment. Some authorities impose tax at a particular percentage of the lessor's acquisition price, others impose tax on the value of a lease which is written in the authority's jurisdiction, others impose tax on the first time the equipment is leased in the authority's jurisdiction, and some authority's have varying rates if the vehicle is leased for varying terms. With some authorities, the tax is based on the depreciated value of the equipment, and with some authorities the tax is not due if the equipment is greater than a certain age.

For leasing companies which own large numbers of equipment which are of moveable nature, e.g., automobiles, trucks, trailers, modular buildings, and tractors, calculation and payment of use tax to the appropriate taxing jurisdiction at the appropriate time so as to avoid penalties and to avoid duplicate payments or over payments has been a manual process which is very time consuming, complex, subject to many sources of error, and often results in penalties from the taxing authorities due to late payments. Many of the taxing authorities allow the leasing companies to determine the tax due, subject to later auditing by the tax authority, and so it is important for the lessor to calculate the tax correctly the first time to reduce the risk of penalties.

Leasing companies have recognized that significant savings in sales and use taxes may be possible if their leasing activities are optimized with respect to equipment and taxing jurisdictions. For example, if otherwise equivalent articles are available to lease but with different sales and use tax consequences, great savings may be possible by choosing to lease the articles to incur the least taxes.

To date, no systems have become available for leasing companies to effectively systematize their sales and use tax optimization activities.

SUMMARY OF THE INVENTION

We have discovered that great savings can result from automating and optimizing leasing processes so as to minimize sales and use taxes when there are multiple taxing authorities with differing laws and regulations. We have also discovered that the timing of the payment of such taxes to such authorities can be improved by such automation.

The present invention comprises, in one aspect, a computer assisted method for a lessor to determine correct use tax on moveable equipment which may be subject to tax by more than one tax authority comprising:

creating inventory records, within an inventory module, for each individual item of equipment, the record comprising an equipment identifier, equipment category, acquisition cost, depreciation, net book value, and branch assignment;

updating the inventory record for each item of equipment to reflect each modification, improvement, disposition, and change in equipment category, and use tax paid;

creating activity records in a lease activity module comprising each lease event pertaining to each item of equipment, the events comprising revenue generating lease, non-revenue generating lease, maintenance, and termination of lease;

creating in a rules module a set of tax rules for each taxing authority where any of the items of equipment may be leased or used, the rules comprising sets of formulas reflecting relationships between tax due and one or more of: acquisition of equipment, first leasing of equipment, subsequent leasing of equipment, age of equipment, length of lease term, and equipment categories;

updating the rules module to reflect each change, addition, or deletion of each tax rule for each taxing authority; and upon selection of a tax authority and a date range, processing the records according to the rules to determine the amount of tax which is due to the selected tax authority for each item of equipment;

upon verification that tax will be paid, updating the inventory records to reflect tax paid.

The non-revenue generating lease can be a logistics lease or a maintenance lease. A maintenance lease event is when an item is removed from available inventory and charged out to a third party maintenance party for repair or maintenance. A logistics lease is when an item is leased at a first location and returned to a second location by the lessee for no cash compensation since the lessor needs the item at the second location for logistics purposes.

In another aspect, the invention comprises a system for managing the payments of use tax on leased equipment to appropriate tax authorities and for optimizing the amount of use tax due comprising an inventory module comprising inventory records for each individual item of equipment, the records comprising an equipment identifier, equipment category, acquisition cost, depreciation, net book value, branch assignment and any use tax paid;

a lease activity module comprising activity records for each item of equipment, the activity records comprising each revenue generating lease, non-revenue generating lease, and termination of lease;

a rules module comprising a set of tax rules for each taxing authority where the equipment may be leased or used, the rules comprising sets of formulas for determining whether, when, and how much tax is due for each lease event or inventory record creation or change;

means to update the inventory records to reflect each modification, improvement, disposition, and change in equipment category, and use tax paid;

means to update the activity records to reflect each lease event;

means to update the rules to reflect each change, addition, or deletion of each tax rule for each taxing authority; and means to select a tax authority and date range; and processing means to determine the amount of tax which is due to the selected tax authority for each item of equipment and to update the inventory records to reflect tax paid.

Preferably the equipment of a particular class which is available for lease for a proposed period at a particular branch is automatically ranked according to the amount of use tax which will be due upon leasing for the proposed period. The ranking can be displayed at a leasing agent workstation upon inquiry as to the availability of equipment of a particular class to be leased for a proposed period of time at a particular branch. A branch is a leasing location where inventory may be stored, returned, and leased.

The system can include a plurality of client workstations at various branches, i.e., equipment leasing branches where leasing transactions are conducted. The system can also include one or more servers which are networked to the client workstations. The server can be a webserver and the clients can include web browsers, and the information can be transmitted between the clients and web server using internet protocols, hypertext markup language, or other markup languages such as XML.

DETAILED DESCRIPTION OF THE INVENTION AND THE PREFERRED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
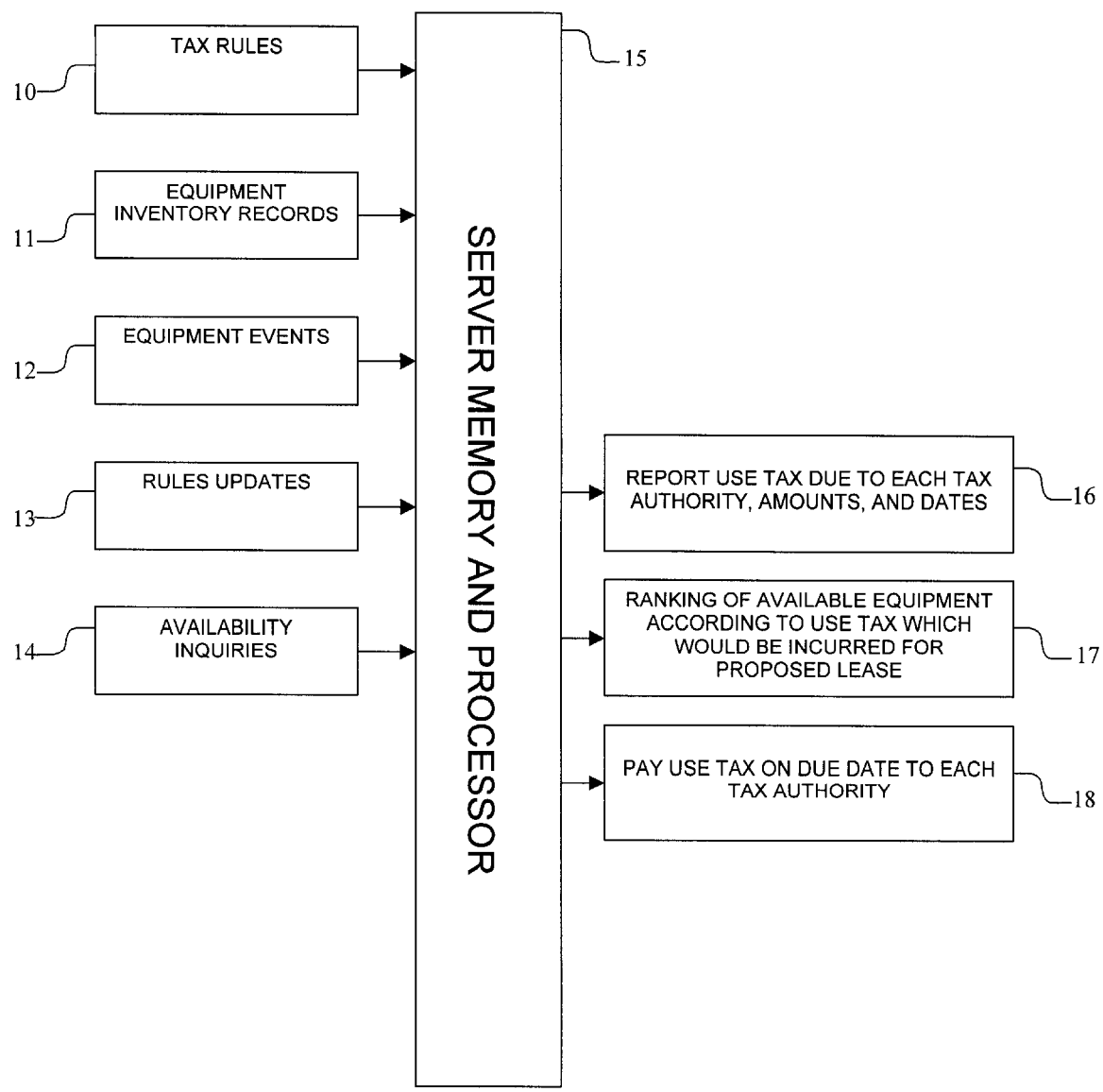
FIG. 1 is a block diagram of the general logic of a computer system of the invention.

Referring first to FIG. 1, the present invention will be outlined.

FIG. 1 depicts the concept of the computer-assisted method for determining the correct use tax on moveable equipment which may be subject to tax by more than one tax authority which comprises a server 15 which comprises memory and processor. The server can be any of the server types which are well known or will be developed in the future, as long as the server functions to process and store data according to algorithms programmed according to the invention. The server memory contains tax rules 10 and equipment inventory records 11. The inventory records comprise an equipment identifier, equipment category, acquisition cost, depreciation, net book value, and branch. The inventory record for each item of equipment is updated to reflect each modification, improvement, disposition, and change in equipment category, and use tax paid, either automatically in embodiments when the tax is paid automatically, or manually in embodiments wherein equipment category is changed by an agent or manager.

The system also comprises a lease activity module comprising activity records for each item of equipment, the activity records comprising each revenue generating lease, non-revenue generating lease, and termination of lease.

The tax rules 10 can be very complex, and will typically vary from taxing authority to taxing authority.

Every time a piece of equipment is placed in inventory, removed from inventory, leased to a customer, removed from service, moved to a different location (referred to herein as a branch), removed from inventory to a maintenance company, or sold, an equipment event 12 is recorded, for example by entering a lease at a workstation when an agent leases the equipment to a customer.

Whenever a rule for a particular jurisdiction changes, a new rule must be entered, usually at a workstation, and the rules module is updated with the new rule for use during the effective date of the new rule. Thus, each change, addition, or deletion of each tax rule for each taxing authority is recorded within the computer system. The system can retain historical rules for use in calculating or auditing tax for lease or other events occurring during prior time periods. Depending on user preference, the system can automatically report 16 use tax due to each tax authority on or before the due date, following the tax rules 10 and considering the inventory records 11 and equipment events 12, or can generate reports when queried by a user when the user does not wish to depend on the system to automatically generate the reports. If a more automated system is desired, the program can automatically print checks and tax forms and pay 18 the use tax on the due dates to each tax authority without any user request. When the user at a workstation selects a tax authority and a date range, the system processes the records according to the rules to determine the amount of tax which is due to the selected tax authority for each item of equipment and, upon verification that tax will be paid, the system updates the inventory records to reflect tax paid.

A second function of the invention is to automatically calculate 17 the use tax consequences of any prospective lease when a leasing agent or, in some case a customer, enters a request for availability 14 of equipment. Preferably the system does not report the use tax which will be due for each of the available pieces of equipment which meet the criteria of the request for availability 14, but rather the system will automatically rank the available equipment which meet the criteria according to the use tax which would be incurred for the proposed lease. Such a system is advantageous in situations wherein the lessor does not separately collect use tax from the customers, but incurs it as the lessor's own expense, in which case when the lessor would incur less use tax in leasing a particular item from inventory on which no tax, or lower tax, would be due; the lessor's agent will be automatically prompted to lease that item rather than an equivalent one on which use tax will be incurred upon entering into the proposed lease. In a situation where the customer will be liable for the use tax, such a ranking will be advantageous to the customer, who can then pick the item which will cost the least after tax is added.

Figure 2:
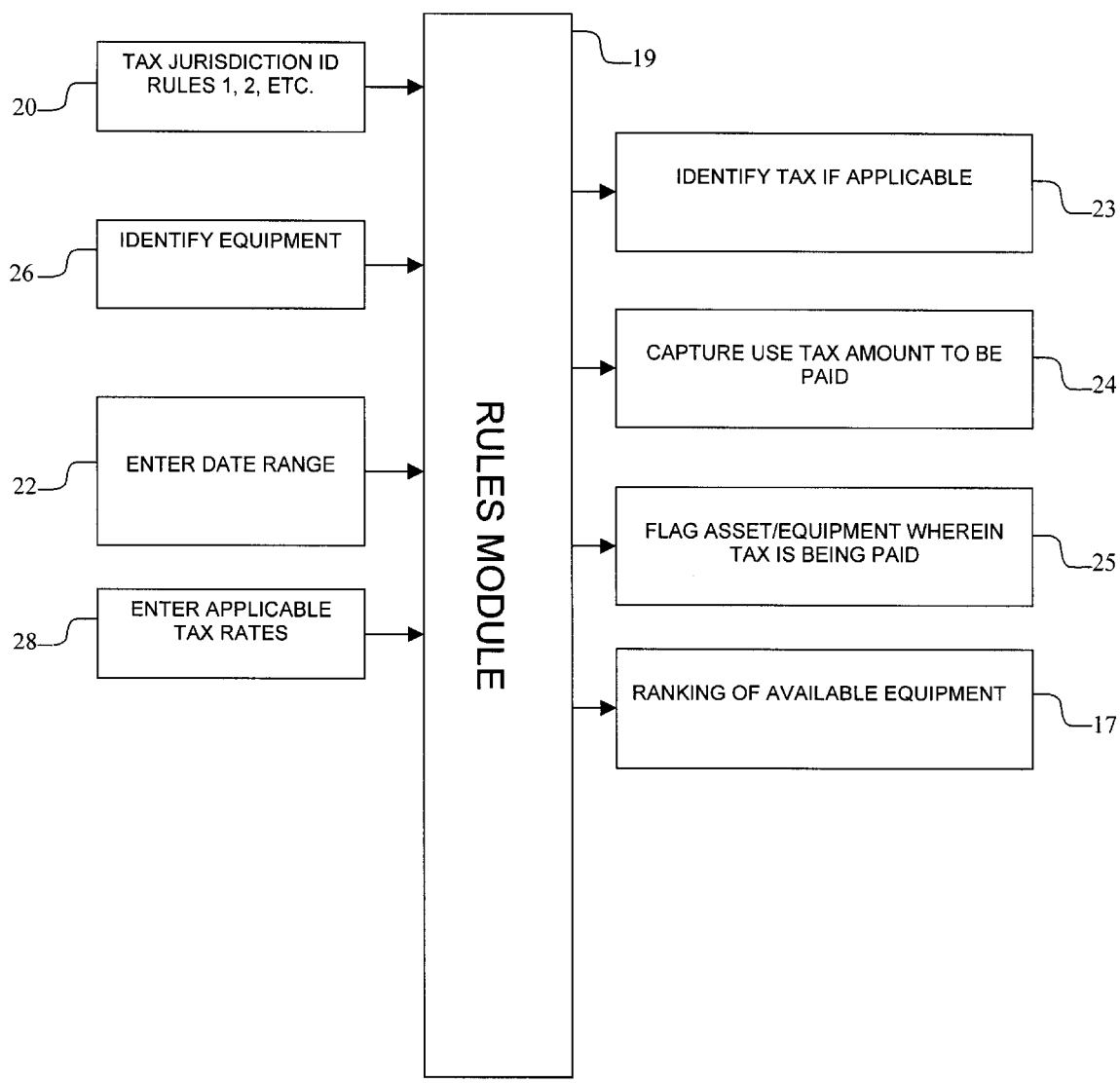
FIG. 2 is a block diagram of the general logic of a rules module used in the invention.

Referring now to FIG. 2, the rules module 19 includes rules 1, 2, etc., and the tax jurisdiction identity to which the tax rule applies 20 and the date range 22 during which the tax rule is applicable. The tax rates for each jurisdiction 28 are entered and updated when they change. Upon entry of an equipment identity 26, the rules module returns an identification of tax if applicable 23, captures the use tax amount to be paid 24, flags the asset or equipment wherein tax is being paid 25, and, optionally, ranks the available equipment 17 according to the amount of use tax to be incurred upon leasing.

An example of such a calculation follows:

Input:
Activity Date: Jan. 1, 1999 to Jun. 30, 1999
Acquisition Acceptance date: Jan. 1, 1997 to Jun. 30, 1999
Tax Rate: 6.00%
Fed Rate: 8.00%
Unit Number: 204821
Avi_cost: $6000
Information from system:
  1) unit is less than 50 months old.
  2) Never paid Illinois tax on unit before.
  3) Unit went out for Illinois for the first time on Mar. 3, 1999
  4) Unit not a one way move.
Out put from system based on rules.
  $v\_{tax}\_base := avi\_cost - (avi\_cost * avi\_fe\_tax\_percent)$;

```
            := $6000 - $6000 * .08 = 6000 = 480 = 5520
     v_tax_depreciated:=v_tax_base-(0.02 * MONTHS_BETWEEN
    (avi_commencement_date,avi_acq_accept_date) * avi_cost));
            := 5520 - (.02 * (20 * 6000)
            := 5520 - (.02 * (120000)
            := 5520 - 2400
            := $3120
    v_final_tax : = v_tax_depreciated * avi_tax_rate;
            := $3120 * .06
            := $187.20
``` wherein

"avi_cost" represents original cost of unit

"v_tax_base" represents reduced value of unit after removing federal excise tax

"v_final_tax" amount of tax due to taxing authority

"v_tax_depreciated" represents reduced value of unit after removing federal excise tax and depriciation taken on a monthly basis "avi_fe_tax_percent" represents federal excise tax rate "avi_commencement_date" represents date unit put into service "avi_tax_rate" represents tax rate of taxing authority The output is that a tax of 187.20 is due as first use tax. The system stores the information when tax is paid. The above information will be useful when planning one way moves and also for demonstrating tax compliance when audits are done.

While the forgoing has illustrated the principles of the invention, various modifications, changes, alterations and improvements should readily occur to those skilled in the art without departing from the spirit and scope of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer assisted method for a lessor to determine correct use tax on moveable equipment which may be subject to tax by more than one tax authority comprising:

creating inventory records, within an inventory module, for each individual item of equipment, the record comprising an equipment identifier, equipment category, acquisition cost, depreciation, net book value, and branch;

updating the inventory record for each item of equipment to reflect each modification, improvement, disposition, and change in equipment category, and use tax paid;

creating activity records in a lease activity module comprising each lease event pertaining to each item of equipment, the events comprising revenue generating lease, non-revenue generating lease, and termination of lease;

creating in a rules module a set of tax rules for each taxing authority where any of the items of equipment may be leased or used, the rules comprising sets of formulas reflecting relationships between tax due and one or more of: acquisition of equipment, first leasing of equipment, subsequent leasing of equipment, length of lease term, age of equipment, and equipment categories;

updating the rules module to reflect each change, addition, or deletion of each tax rule for each taxing authority; and upon selection of a tax authority and a date range, processing the records according to the rules to determine the amount of tax which is due to the selected tax authority for each item of equipment;

upon verification that tax will be paid, updating the inventory records to reflect tax paid.

2. Method of claim 1 wherein upon querying the inventory module to determine availability of equipment of a selected class, delivery branch, and date range, automatically ranking available equipment of the selected class, delivery branch, and date range according to the amount of use tax which will be due upon leasing.

3. Method of claim 2 wherein the ranking is displayed at a leasing agent workstation upon the querying.

4. Method of claim 1 wherein the non-revenue generating lease event is a logistics lease or a maintenance lease.

5. System for managing the payments of use tax on leased equipment to appropriate tax authorities and for optimizing the amount of use tax due comprising an inventory module comprising inventory records for each individual item of equipment, the records comprising an equipment identifier, equipment category, acquisition cost, depreciation, net book value, branch and any use tax paid;

a lease activity module comprising activity records for each item of equipment, the activity records comprising each revenue generating lease, non-revenue generating lease, and termination of lease;

a rules module comprising a set of tax rules for each taxing authority where the equipment may be leased or used, the rules comprising sets of formulas for determining whether, when, and how much tax is due for each lease event or inventory record creation or change;

means to update the inventory records to reflect each modification, improvement, disposition, and change in equipment category, and use tax paid;

means to update the activity records to reflect each lease event;

means to update the rules to reflect each change, addition, or deletion of each tax rule for each taxing authority; and means to select a tax authority and date range; and processing means to determine the amount of tax which is due to the selected tax authority for each item of equipment and to update the inventory records to reflect tax paid.

6. System of claim 5 further including means to query the inventory module to determine availability of equipment of a selected class, delivery branch, and date range, and processing means to automatically rank available equipment of the selected class which is available for lease for the date range at the delivery branch according to the amount of use tax which will be due upon leasing for the proposed period.

7. System of claim 6 including means to display the ranking at a leasing agent workstation in response to the query.

8. System of claim 5 wherein the means to update the inventory records comprises a client workstation in communication with a server computer.

9. System of claim 5 wherein the means to update the rules module comprises a client workstation in communication with a server computer, and the rules module is stored on the server.

10. System of claim 5 wherein the equipment is selected from the group consisting of motor vehicles, trailers, and modular buildings.

11. System of claim 5 wherein the non-revenue generating lease is a logistics lease or a maintenance lease.

* * * * *